(12) United States Patent
Ohtsuka et al.

(10) Patent No.: US 8,824,876 B2
(45) Date of Patent: Sep. 2, 2014

(54) EXHAUST APPARATUS OF AIR-COOLED FUEL CELL VEHICLE

(75) Inventors: Ryuji Ohtsuka, Shizuoka-ken (JP); Yoshimasa Matsumoto, Shizuoka-ken (JP); Tohru Ohta, Shizuoka-ken (JP); Kengo Ikeya, Shizuoka-ken (JP)

(73) Assignee: Suzuki Motor Corporation (JP ( * ) Notice: Subject to any disclaimer, the term of this patent is extended or adjusted under 35 U.S.C. 154(b) by 153 days.

(21) Appl. No.: 13/638,305

(22) PCT Filed: May 24, 2011

(86) PCT No.: PCT/JP2011/061833
§ 371 (c)(1),
(2), (4) Date: Sep. 28, 2012

(87) PCT Pub. No.: WO2011/148927
PCT Pub. Date: Dec. 1, 2011

(65) Prior Publication Data
US 2013/0094842 A1 Apr. 18, 2013

(30) Foreign Application Priority Data

May 28, 2010 (JP) ................. 2010-122579

(51) Int. Cl.
| B67D 7/80 | (2010.01) |
| B05B 1/24 | (2006.01) |
| B60L 1/00 | (2006.01) |
| B60L 11/18 | (2006.01) |
| H01M 8/04 | (2006.01) |
| H05B 3/00 | (2006.01) |
| F16L 41/02 | (2006.01) |
| B60K 1/00 | (2006.01) |
| B60K 1/04 | (2006.01) |
| B60K 11/06 | (2006.01) |

(52) U.S. Cl.
CPC ............... *F16L 41/02* (2013.01); *B60L 1/003* (2013.01); *B60L 11/1896* (2013.01); *H01M 2250/20* (2013.01); *Y02E 60/50* (2013.01); *B60K 2001/003* (2013.01); *H01M 8/04156* (2013.01); *Y02T 90/32* (2013.01); *B60L 11/1894* (2013.01); *H01M 8/04014* (2013.01); *H05B 3/00* (2013.01); *B60L 11/1898* (2013.01); *B60K 2001/0411* (2013.01); *B60L 11/1892* (2013.01); *B60K 1/04* (2013.01); *B60K 11/06* (2013.01); *Y02T 90/34* (2013.01); *B60K 2001/005* (2013.01)
USPC ........................... 392/465; 180/68.1; 392/473

(58) Field of Classification Search
None
See application file for complete search history.

(56) References Cited

U.S. PATENT DOCUMENTS 3,616,871 A * 11/1971 West .............................. 180/68.1
3,647,256 A *  3/1972 Cox ................................. 296/91
(Continued)

FOREIGN PATENT DOCUMENTS

| JP | 2000-062475 | 2/2000 |
| JP | 2001-229948 | 8/2001 |

(Continued)

OTHER PUBLICATIONS

International Search Report corresponding to International Application No. PCT/JP2011/061833 mailed Aug. 9, 2011.

*Primary Examiner* — Thor Campbell
(74) *Attorney, Agent, or Firm* — Myers Bigel Sibley & Sajovec, P.A.

(57) ABSTRACT

An exhaust apparatus includes a lower side exhaust duct and an upper side exhaust duct which are branched vertically, and in that the lower side exhaust duct is extended toward the lower side of the vehicle from an exhaust outlet portion of the air-cooled fuel cell stack, and the downstream end portion of the lower side exhaust duct is opened at a lower portion of the front compartment, while the upper side exhaust duct is extended toward the upper side of the vehicle from an upper portion of an outer wall of the lower side exhaust duct, the outer wall extending toward the lower side of the vehicle, and the downstream end portion of the upper side exhaust duct is opened between the rear end portion of the front hood and the front end portion of the front window.

8 Claims, 3 Drawing Sheets

(56) References Cited

U.S. PATENT DOCUMENTS

| | | | | |
|---|---|---|---|---|
| 5,137,326 A | * | 8/1992 | George | 296/208 |
| 5,823,609 A | * | 10/1998 | Morris | 296/180.1 |
| 6,230,832 B1 | * | 5/2001 | von Mayenburg et al. | 180/68.1 |
| 6,302,228 B1 | * | 10/2001 | Cottereau et al. | 180/68.1 |
| 6,736,447 B2 | * | 5/2004 | Angelo et al. | 296/180.1 |
| 7,980,344 B2 | * | 7/2011 | Kubo et al. | 180/68.1 |
| 2004/0069445 A1 | * | 4/2004 | Schurle et al. | 165/42 |

FOREIGN PATENT DOCUMENTS

| | | |
|---|---|---|
| JP | 2006-240475 | 9/2006 |
| JP | 2009-078623 | 4/2009 |
| JP | 2010-015845 | 1/2010 |

\* cited by examiner

EXHAUST APPARATUS OF AIR-COOLED FUEL CELL VEHICLE

RELATED APPLICATIONS

This application is a 35 U.S.C. §371 national stage application of PCT Application No. PCT/JP2011/061833, filed on May 24, 2011, which claims priority from Japanese Application No. 2010-122579 filed May 28, 2010, the contents of which are incorporated herein by reference in their entireties. The above-referenced PCT International Application was published as International Publication No. WO 2011/148927 A1 on Dec. 1, 2011.

TECHNICAL FIELD

The present invention relates to an exhaust apparatus of an air-cooled fuel cell vehicle, and in particular, relates to an exhaust apparatus of an air-cooled fuel cell vehicle which improves the exhaust performance of an air-cooled fuel cell stack arranged in a front compartment of the vehicle and which prevents intrusion of water and foreign matter into the air-cooled fuel cell stack.

BACKGROUND ART

In vehicles in which a fuel cell stack formed by stacking a plurality of fuel-cell cells is used as a drive energy source, a water cooling system (water-cooled fuel cell stack) is generally adopted for cooling the fuel cell stack. In the case of a water-cooled fuel cell vehicle in which a water-cooled fuel cell stack is adopted, air compressed by a high-pressure compressor is usually supplied to the fuel cell stack, and exhaust gas is generally discharged to the outside of the vehicle from an exhaust pipe extended toward the rear side of the vehicle (Patent Literature 1).

FIG. 5 shows a general system configuration of a conventional water-cooled fuel cell vehicle. In a water-cooled fuel cell vehicle system 101 shown in FIG. 5, power generation is performed by a plurality of fuel-cell cells stacked in a water-cooled fuel cell stack 104 in such a manner that compressed hydrogen gas stored in a high pressure hydrogen tank 102 is introduced into an anode intake portion 105 of the water-cooled fuel cell stack 104 via a pressure reducing valve 103, and that, on the other hand, the outside air, which is drawn through a filter 106 and which is used as a reaction gas reacting with hydrogen, is compressed by a compressor 107, so as to be introduced into a cathode intake portion 108 of the water-cooled fuel cell stack 104. After a part of moisture in cathode exhaust gas discharged from a cathode exhaust portion 109 of the water-cooled fuel cell stack 104 is separated by a gas-liquid separator 110, the cathode exhaust gas is discharged to the outside air via a backpressure valve 111 used for controlling the pressure of the cathode system. Further, similarly, anode exhaust gas discharged from an anode exhaust portion 112 of the water-cooled fuel cell stack 104 is also made to pass through a gas-liquid separator 113, and is mixed into the cathode exhaust gas through a purge valve 114. The amount (flow rate) of purge hydrogen exhausted from the anode exhaust portion 112 is sufficiently small as compared with the amount of cathode exhaust gas. For this reason, the purge hydrogen exhausted from the anode exhaust portion 112 can be discharged to the outside air after the concentration of the purge hydrogen is reduced by the cathode exhaust gas to at most the flammable lower limit concentration of 4%. Note that there are also some systems which are configured to recirculate the anode exhaust gas to the anode intake portion 105 by using a hydrogen pump 115.

In a cooling system 116 of the water-cooled fuel cell vehicle system 101, a water pump 117 is provided in a stage preceding or subsequent to the fuel cell in the cooling loop, so as to pressure-feed cooling water. After cooling the water-cooled fuel cell stack 104, the cooling water is subjected to heat exchange with the atmosphere in a radiator 118, and is then again returned to the water-cooled fuel cell stack 104. In the cooling system 116, a heater core 120 for heating the interior of the vehicle compartment and a regulating valve 119, which are connected in series with each other, are provided in parallel with the radiator 118. When the vehicle compartment needs to be heated, the heating is performed by opening the regulating valve 119 to supply high temperature cooling water to the heater core 120 and by driving an air blowing fan 121. However, the amount of waste heat of the water-cooled fuel cell stack 104 is very small as compared with the amount of heat generated by an internal combustion engine, and hence the other auxiliary heat source, such as an electric heater, is generally used in addition to the heater core 120.

The above-described water-cooled fuel cell vehicle system 101 is provided with many auxiliary units including the compressor 107 for compressing the introduced air, in order to increase the output power density of the water-cooled fuel cell stack 104. For this reason, in the water-cooled fuel cell vehicle system 101, the system is complicated, and also the size, weight and cost of the system are increased.

On the other hand, there is an air-cooled fuel cell vehicle in which the system is simplified in such a manner that auxiliary units, such as a compressor, are eliminated as much as possible, and that an air cooling system (air-cooled fuel cell stack) is adopted for cooling the fuel cell stack. In the case of the air-cooled fuel cell vehicle in which an air-cooled fuel cell stack is adopted, air serving as a reaction gas as well as a cooling medium is supplied at a lower pressure by an air supply fan instead of a high pressure compressor (Patent Literature 2).

Citation List

Patent Literature

[PTL 1] Japanese Patent Laid-Open No. 2010-15845
[PTL 2] Japanese Patent Laid-Open No. 2001-229948

SUMMARY OF INVENTION

Technical Problem

However, in the case of an air-cooled fuel cell vehicle in which an air-cooled fuel cell stack is adopted, it is preferred to reduce exhaust pressure loss as much as possible, for of reasons, such as the need to reduce as much as possible the power consumption of the air supply fan for supplying air serving as a reaction gas as well as a cooling medium. As in many air-cooled fuel cell vehicles, in order to enable the exhaust pipe to be extended to the rear side of the vehicle, it is necessary to significantly increase the amount and pressure of air supplied by the air supply fan, which results in an increase in power consumption.

The present invention relates to an air-cooled fuel cell vehicle provided with an air-cooled fuel cell stack to which air serving as a reaction gas as well as a cooling medium is supplied, and an object of the present invention is to improve the exhaust performance of an exhaust duct for discharging excess air and hydrogen gas from the air-cooled fuel cell stack and is to prevent intrusion of water and foreign matter into the air-cooled fuel cell stack.

Solution to Problem

The present invention is to provide an exhaust apparatus of an air-cooled fuel cell vehicle in which an air-cooled fuel cell stack supplied with air serving as a reaction gas as well as a cooling medium is arranged in a front compartment under a front hood, and in which hydrogen and air that are discharged without being consumed in the air-cooled fuel cell stack are guided to the outside of the vehicle through an exhaust duct connected to a rear portion of the air-cooled fuel cell stack, the exhaust apparatus being featured in that the exhaust duct is composed of a lower side exhaust duct and an upper side exhaust duct which are branched vertically, and in that the lower side exhaust duct is extended toward the lower side of the vehicle from the exhaust outlet portion of the air-cooled fuel cell stack, and the downstream end portion of the lower side exhaust duct is opened at a lower portion of the front compartment, while the upper side exhaust duct is extended toward the upper side of the vehicle from an upper portion of an outer wall of the lower side exhaust duct, the outer wall extending toward the lower side of the vehicle, and the downstream end portion of the upper side exhaust duct is opened between the rear end portion of the front hood and the front end portion of a front window.

Advantageous Effects of Invention

In the exhaust apparatus of the air-cooled fuel cell vehicle according to the present invention, the exhaust duct of the air-cooled fuel cell stack is composed of the lower side exhaust duct and the upper side exhaust duct which are branched vertically, and thereby the passage sectional area of the exhaust duct is increased, so as to reduce the ventilation loss. Further, in the exhaust apparatus of the air-cooled fuel cell vehicle according to the present invention, the lower side exhaust duct is extended toward the lower side of the vehicle from the exhaust outlet portion of the air-cooled fuel cell stack, and the downstream end portion of the lower side exhaust duct is opened at a lower portion of the front compartment, while the upper side exhaust duct is extended toward the upper side of the vehicle from an upper portion of an outer wall of the lower side exhaust duct, the outer wall extending toward the lower side of the vehicle, and the downstream end portion of the upper side exhaust duct is opened between the rear end portion of the front hood and the front end portion of the front window. For this reason, in the exhaust apparatus of the air-cooled fuel cell vehicle according to the present invention, the upper side exhaust duct can be opened upward with a shortest distance. Thereby, the exhaust performance of hydrogen gas having specific gravity smaller than that of air can be improved, and water and foreign matter, which flow into the upper side exhaust duct from the downstream end portion of the upper side exhaust duct, are made to flow to the side of the downstream side exhaust duct, so that the water and foreign matter can prevented from intruding into the air-cooled fuel cell stack.

DESCRIPTION OF EMBODIMENTS

In the following, an example according to an embodiment of the present invention will be described with reference to accompanying drawings.

Example

Figure 1:
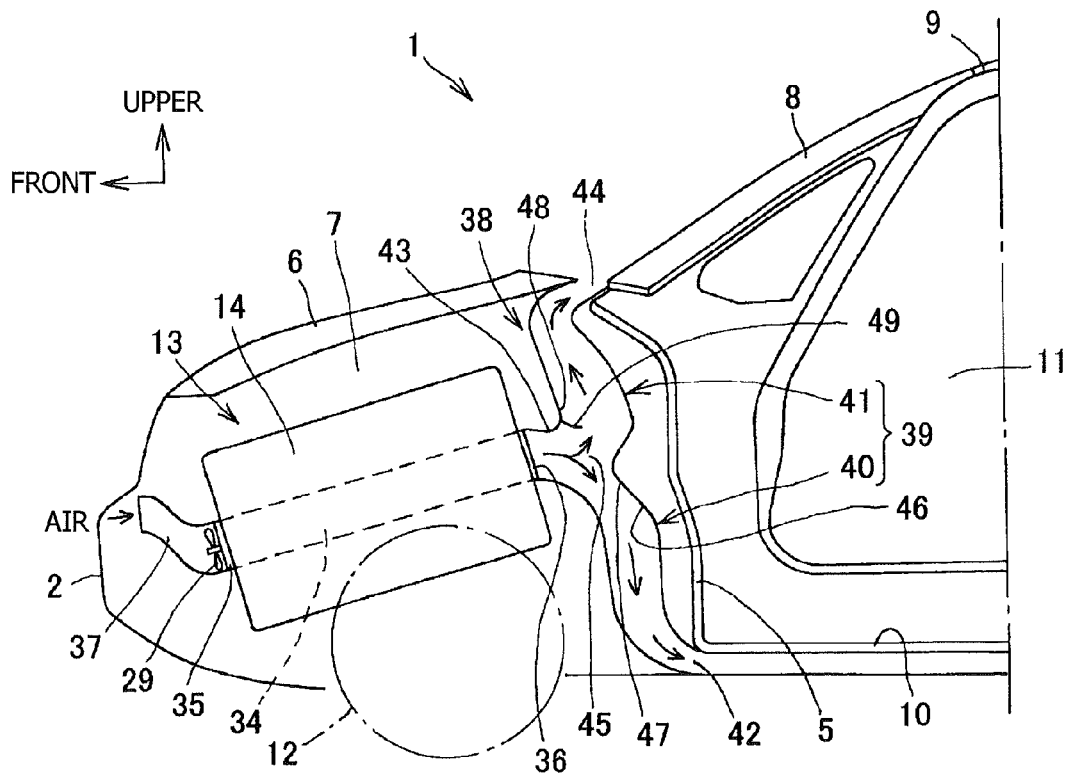
FIG. 1 is a sectional side view of a front portion of an air-cooled fuel cell vehicle. (Example)
Figure 2:
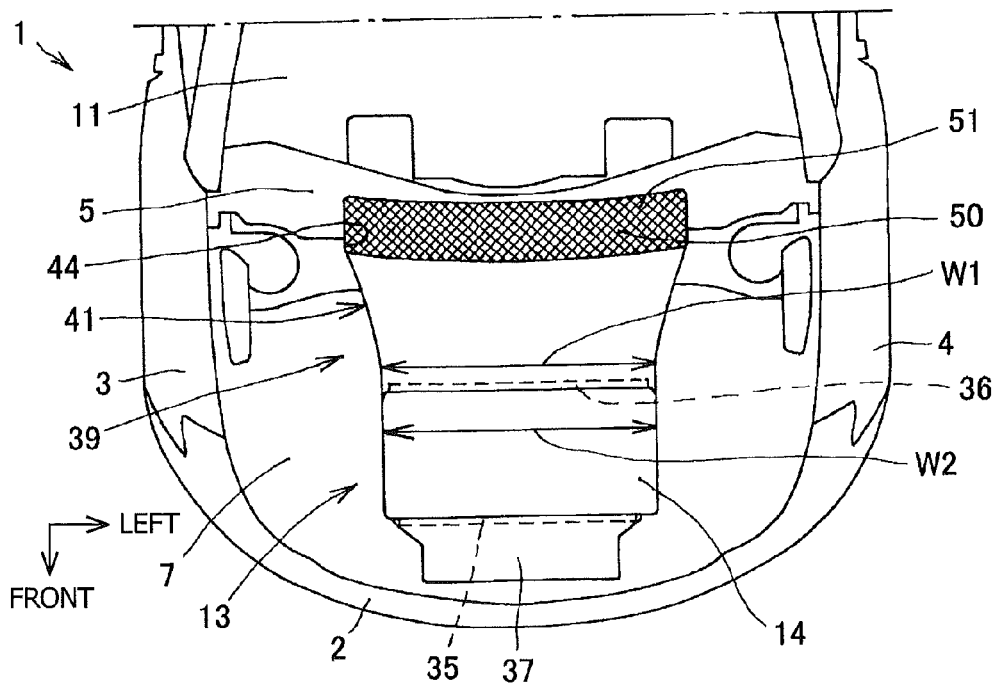
FIG. 2 is a plan view of the front portion of the air-cooled fuel cell vehicle. (Example)

FIG. 1 to FIG. 4 show an example according to the present invention. In FIG. 1 and FIG. 2, reference numeral 1 denotes an air-cooled fuel cell vehicle, reference numeral 2 denotes a front bumper, reference numeral 3 denotes a right fender apron, reference numeral 4 denotes a left fender apron, reference numeral 5 denotes a dash panel, reference numeral 6 denotes a front hood, reference numeral 7 denotes a front compartment, reference numeral 8 denotes a front window, reference numeral 9 denotes a roof panel, reference numeral 10 denotes a floor panel, reference numeral 11 denotes a vehicle compartment, and reference numeral 12 denotes a front wheel. In the air-cooled fuel cell vehicle 1, the front compartment 7 is formed by being surrounded by the front bumper 2, the right and left fender aprons 3 and 4, and the dash panel 5 and by being covered by the front hood 6. The vehicle compartment 11 surrounded by the front window 8, the roof panel 9, the floor panel 10, and right and left doors is formed on the rear side of the dash panel 5.

Figure 3:
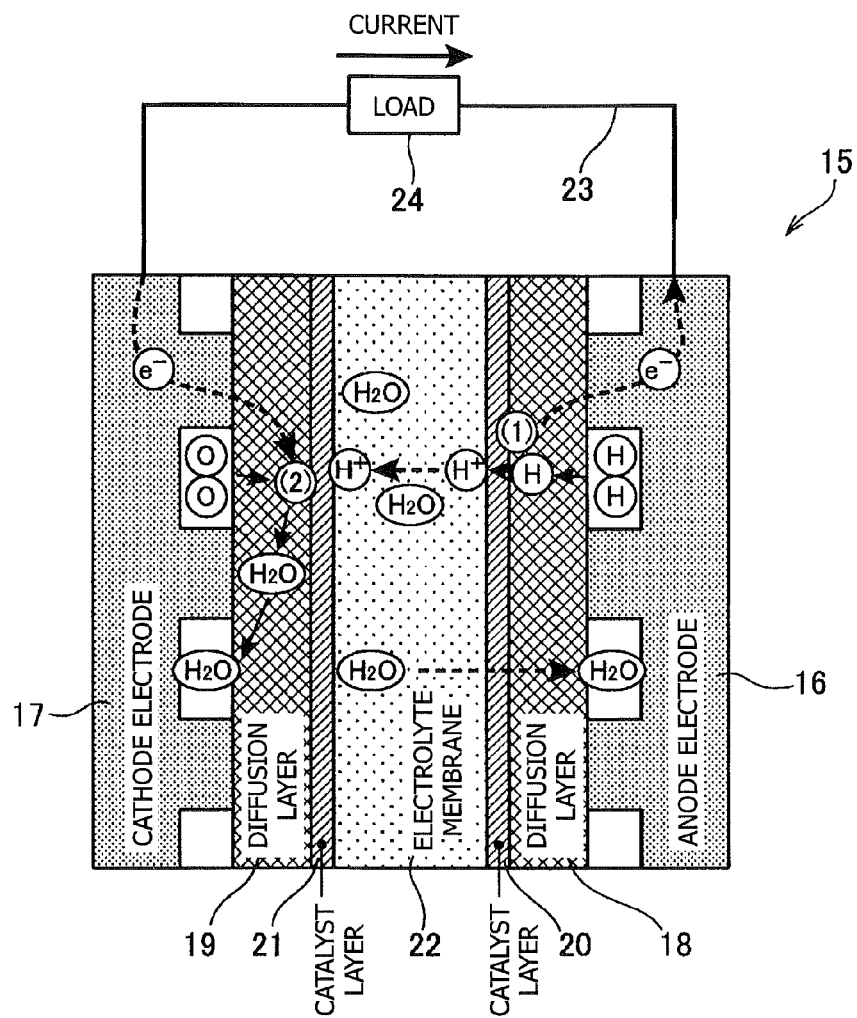
FIG. 3 is a cross-sectional view of a fuel-cell cell of an air-cooled fuel cell stack.

In the air-cooled fuel cell vehicle 1, an air-cooled fuel cell stack 14 of an air-cooled fuel cell vehicle system 13 is arranged in the front compartment 7. As shown in FIG. 3, in the air-cooled fuel cell stack 14, the stack is usually formed by stacking many minimum structural units referred to as fuel-cell cells 15. In this configuration, electricity is generated by electrochemical reaction, and water is produced in association with the generation of electricity.

In a conventional solid polymer fuel cell stack, each of the fuel-cell cells 15 is configured such that the diffusion layers 18 and 19 are sandwiched between an anode electrode 16 and a cathode electrode 17 for respectively supplying hydrogen and air (oxygen) serving as a reaction gas, and such that catalyst layers 20 and 21 for activation of the reaction, between which an electrolyte membrane 22 for selectively permeating hydrogen ions is sandwiched, are sandwiched between the diffusion layers 18 and 19.

Hydrogen molecules supplied to the anode electrode 16 turn into active hydrogen atoms in the catalyst layer 20 provided on the surface of the electrolyte membrane 22 on the side of the anode electrode 16, and further turn into hydrogen ions by releasing electrons. The reaction indicated by (1) in FIG. 3 is expressed by following Chemical Formula 1.

[Math. 1]

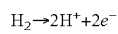  [Formula 1]

The hydrogen ions generated in Chemical Formula 1 are moved through the electrolyte membrane 22 from the side of the anode electrode 16 to the side of the cathode electrode 17 together with the moisture contained in the electrolyte membrane 22, while electrons are moved to the side of the cathode electrode 17 through an external circuit 23. By the movement of electrons, current flows through a load (a motor for traveling in the present example) 24 interposed in the external circuit 23.

On the other hand, oxygen molecules in the air supplied to the cathode electrode 17 receive, in the catalyst layer 21, electrons supplied from the external circuit 23, so as to turn into oxygen ions, and the oxygen ions combine with the hydrogen ions having moved through the electrolyte membrane 22, so as to form water. The reaction indicated by (2) in FIG. 3 is expressed by following Chemical Formula 2.

[Math. 2]

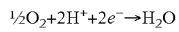 [Formula 2]

$\frac{1}{2}O_2 + 2H^+ + 2e^- \rightarrow H_2O$

A part of the water formed in this way is moved from the cathode electrode 17 to the anode electrode 16 by concentration diffusion.

In the above-described chemical reaction, various losses, such as a resistance overvoltage resulting from the electric resistance of the electrolyte membrane 22 and the electrode, an activation overvoltage required for the generation of the electrochemical reaction of hydrogen and oxygen, and a diffusion overvoltage required for the movement of hydrogen and oxygen ions through the diffusion layers 18 and 19, are generated in the fuel-cell cell 15, and the waste heat generated due to the losses needs to be removed.

Figure 4:
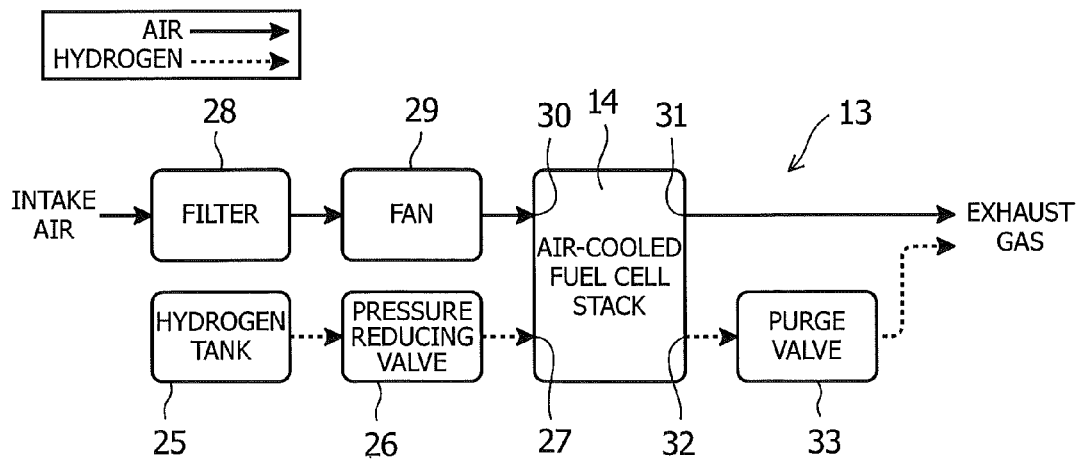
FIG. 4 is a block diagram of an air-cooled fuel cell vehicle system. (Example)
Figure 5:
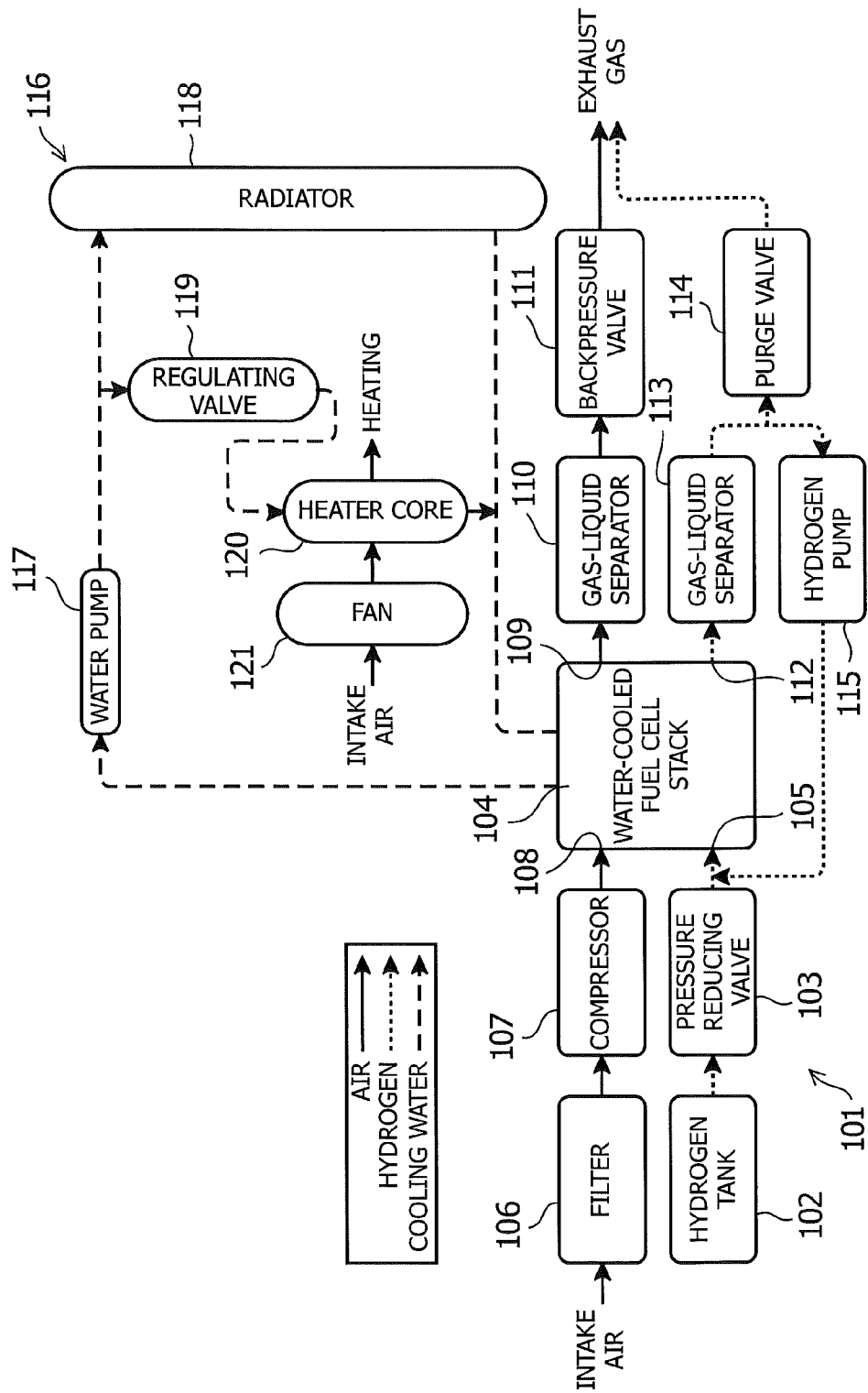
FIG. 5 is a block diagram of a water-cooled fuel cell vehicle system. (Prior art form)

As shown in FIG. 4, in the air-cooled fuel cell vehicle system 13 equipped with the air-cooled fuel cell stack 14 in which a plurality of the fuel-cell cells 15 are stacked, a compressed hydrogen gas stored in a high pressure hydrogen tank 25 is introduced into an anode intake portion 27 of the air-cooled fuel cell stack 14 after the pressure of the compressed hydrogen gas is reduced by a pressure reducing valve 26. On the other hand, in the air-cooled fuel cell vehicle system 13, a high-pressure compressor for supplying cathode intake air, which is provided in the water-cooled fuel cell vehicle system, is not generally provided, and the outside air drawn through a filter 28 is supplied to a cathode intake portion 30 of the air-cooled fuel cell stack 14 by a low-pressure air supply fan 29.

The air supplied to the cathode intake portion 30 is not only used as the reaction gas reacting with hydrogen in the power generation reaction in the fuel-cell cell 15 but also plays a role as the cooling medium for removing the waste heat in the fuel-cell cell 15 and cooling the air-cooled fuel cell stack 14. The air left after the reaction with hydrogen and the air after cooling the air-cooled fuel cell stack 14 are discharged from a cathode exhaust portion 31 of the air-cooled fuel cell stack 14. The anode exhaust gas discharged from an anode exhaust portion 32 of the air-cooled fuel cell stack 14 is mixed into the cathode exhaust gas via a purge valve 33. When the anode side is purged, the exhaust hydrogen gas is discharged to the outside air after being diluted by the cathode side exhaust gas to the flammable lower limit concentration or less.

As shown in FIG. 1 and FIG. 2, the air-cooled fuel cell stack 14, to which air serving as a reaction gas as well as a cooling medium is supplied, is arranged in an attitude inclined toward the front lower side of the front compartment 7 of the air-cooled fuel cell vehicle 1 so that the rear side of the air-cooled fuel cell stack 14 is located higher than the front side of the air-cooled fuel cell stack 14. An air passageway 34 is provided in the inside of the air-cooled fuel cell stack 14 in order to remove waste heat from the fuel-cell cells 15. The air passageway 34 is provided so as to extend from a front intake-air inlet portion 35 to a rear exhaust outlet portion 36 of the air-cooled fuel cell stack 14, and is provided so that the outlet portion 36 is located higher than the inlet portion 35. In the air-cooled fuel cell stack 14, the cathode intake portion 30 is connected to the inlet portion 35 of the air passageway 34, and the cathode exhaust portion 31 and the anode exhaust portion 32 are connected to the outlet portion 36 of the air passageway 34.

An intake duct 37 is connected to the inlet portion 35 of the air passageway 34. The upstream end portion of the intake duct 37 is opened toward the vehicle front side, and the air supply fan 29 is arranged in the inside of the intake duct 37. Further, the downstream end portion of the intake duct 37 is connected to the inlet portion 35 of the air passageway 34. The air intake duct 37 supplies air, serving as the reaction gas, to the cathode intake portion 30, and supplies the air, also serving as the cooling medium, to the air passageway 34. Further, an exhaust duct 39 of an exhaust apparatus 38 is connected to the outlet portion 36 of the air passageway. The upstream end portion of the exhaust duct 39 is connected to the outlet portion 36 of the air passageway 34, and the downstream end portion of the exhaust duct 39 is opened toward the rear side of the vehicle. The exhaust duct 39 guides, to the outside of the vehicle, the hydrogen gas and the air as the reaction gas, which are discharged without being consumed in the air-cooled fuel cell stack 14, and the air after being used for cooling the air-cooled fuel cell stack 14.

As shown in FIG. 1, in the exhaust apparatus 38 of the air-cooled fuel cell vehicle 1, the exhaust duct 39 is composed of a lower side exhaust duct 40 and an upper side exhaust duct 41 which are branched vertically in the front compartment 7. The lower side exhaust duct 40 of the exhaust apparatus 38 is extended from the exhaust outlet portion 36 of the air-cooled fuel cell stack 14 to the lower side of the vehicle, and a lower side opening portion 42 of the downstream end portion of the lower side exhaust duct 40 is opened at a lower portion of the front compartment 7 toward the rear side of the vehicle. On the other hand, the upper side exhaust duct 41 of the exhaust apparatus 38 is extended to the vehicle upper side from an upper portion of an outer wall 43 extending to the vehicle lower side of the lower side exhaust duct 40, and an upper side opening portion 44 of the downstream end portion of the upper side exhaust duct 41 is opened between the rear end portion of the front hood 6 and the front end portion of the front window 8.

Thereby, in the exhaust apparatus 38 of the air-cooled fuel cell vehicle 1, the exhaust duct 39 of the air-cooled fuel cell stack 14 is composed of the lower side exhaust duct 40 and the upper side exhaust duct 41 which are branched vertically. Therefore, the passage sectional area of the exhaust duct 39 is increased so that the ventilation loss can be reduced. Further, in the exhaust apparatus 38 of the air-cooled fuel cell vehicle 1, the lower side exhaust duct 40 is extended from the exhaust outlet portion 36 of the air-cooled fuel cell stack 14 to the lower side of the vehicle, and the lower side opening portion 42 of the downstream end portion of the lower side exhaust duct 40 is opened at a lower portion of the front compartment 7. On the other hand, the upper side exhaust duct 41 is extended to the upper side of the vehicle from the upper portion of the outer wall 43 of the lower side exhaust duct 40, which outer wall extends to the lower side of the vehicle, and the upper side opening portion 44 of the downstream end portion of the upper side exhaust duct 41 is opened between the rear end portion of the front hood 6 and the front end portion of the front window 8. For this reason, in the exhaust apparatus 38 of the air-cooled fuel cell vehicle 1, the upper side exhaust duct 41 can be opened upwards with a shortest distance, so as to improve the exhaust performance of the hydrogen gas having a specific gravity less than that of the air. Also, water and foreign matter flowing into the upper side exhaust duct 41 from the downstream end portion of the upper side exhaust duct 41 are made to flow to the side of the downstream side exhaust duct 40, so as to prevent the water and the foreign matter from intruding into the air-cooled fuel cell stack 14.

In the above-described air-cooled fuel cell stack 14, air serving as the reaction gas as well as the cooling medium is supplied by the air supply fan 29.

Therefore, in the exhaust apparatus 38 of the air-cooled fuel cell vehicle 1, the need that air serving as the reaction gas as well as the cooling medium be supplied to the air-cooled fuel cell stack 14 by being pressurized to a high pressure by a compressor, or the like, can be eliminated by reducing the ventilation resistance of the exhaust duct 39. Thereby, the structure for supplying air to the air-cooled fuel cell stack 14 can be simplified.

The upper side opening portion 44 provided at the downstream end portion of the upper side exhaust duct 41 is directed so as to allow the exhaust gas to flow along the front window 8. Thereby, in the exhaust apparatus 38 of the air-cooled fuel cell vehicle 1, during traveling of the vehicle, the ventilation resistance of the upper side exhaust duct 41 can be reduced in such a manner that the exhaust gas in the upper side exhaust duct 41 is extracted from the upper side opening portion 44 by the air flowing along the front window 8. Further, in the exhaust apparatus 38 of the air-cooled fuel cell vehicle 1, the fogging of the front window 8 in winter or during rainy weather can be prevented by heating the front window 8 with the heat of the exhaust gas.

A mountain-shaped flow dividing portion 47 projecting to the front side of the vehicle is formed on an inner wall 46 of a portion which is provided at a branch portion 45 between the lower side exhaust duct 40 and the upper side exhaust duct 41, and which faces the exhaust outlet portion 36 of the air-cooled fuel cell stack 14.

Thereby, in the exhaust apparatus 38 of the air-cooled fuel cell vehicle 1, the exhaust gas flowing out from the exhaust outlet portion 36 of the air-cooled fuel cell stack 14 is equally divided by the flow dividing portion 47 to the upper side exhaust duct 41 and the lower side exhaust duct 40, so that the ventilation resistance in the exhaust duct 39 can be further reduced.

As shown in FIG. 2, the vehicle-width-direction dimension W1 of the exhaust duct 39 is substantially the same as the vehicle-width-direction dimension W2 of the air-cooled fuel cell stack 14.

Thereby, in the exhaust apparatus 38 of the air-cooled fuel cell vehicle 1, the passage sectional area of the exhaust duct 39 can be significantly increased, and the ventilation resistance of the exhaust duct 39 can be further reduced.

As shown in FIG. 1, an eaves portion 49 projecting toward the rear side of the vehicle is provided on an inner wall 48 of a portion of the upper side exhaust duct 41, which portion is located on the vehicle front side and in the vicinity of the branch portion 45 leading to the lower side exhaust duct 40.

Thereby, in the exhaust apparatus 38 of the air-cooled fuel cell vehicle 1, water and foreign matter having intruded into the upper side exhaust duct 41 from the upper side opening portion 44 can be guided by the eaves portion 49 in the direction opposite to the air-cooled fuel cell stack 14, so as to be discharged from the lower side opening portion 42 of the lower side exhaust duct 40.

As shown in FIG. 2, a reticulated cover 50 is installed at the upper side opening portion 44 of the upper side exhaust duct 41.

Thereby, in the exhaust apparatus 38 of the air-cooled fuel cell vehicle 1, the reticulated cover 50 can prevent that water and foreign matter intrude into the upper side exhaust duct 41 extending to the upper side of the vehicle, from the upper side opening portion 44 of the upper side exhaust duct 41.

The cover 50 is equipped with an electric heater 51 for heating the upper side opening portion 44 of the upper side exhaust duct 41.

Thereby, in the exhaust apparatus 38 of the air-cooled fuel cell vehicle 1, snow and ice, which are attached to the upper side opening portion 44 of the upper side exhaust duct 41 in a cold district, can be melted by the electric heater 51, so that the clogging of the upper side opening portion 44 can be prevented.

INDUSTRIAL APPLICABILITY

The present invention can improve the exhaust performance of the fuel cell stack arranged in the front compartment, and can prevent the intrusion of water and foreign matter. The present invention can also be applied to an exhaust apparatus of a water-cooled fuel cell stack which is included in a fuel cell mounted in a front compartment of a vehicle and which uses air as a reaction gas.

REFERENCE SIGNS LIST

1 Air-cooled fuel cell vehicle
5 Dash panel
6 Front hood
7 Front compartment
8 Front window
14 Air-cooled fuel cell stack
29 Air supply fan
34 Air passageway
35 Inlet portion
36 Outlet portion
37 Intake duct
38 Exhaust apparatus
39 Exhaust duct
40 Lower side exhaust duct
41 Upper side exhaust duct
42 Lower side opening portion
44 Upper side opening portion
45 Branch portion
47 Flow dividing portion
49 Eaves portion
50 Cover
51 Electric heater

The invention claimed is:

1. An exhaust apparatus of an air-cooled fuel cell vehicle in which an air-cooled fuel cell stack supplied with air serving as a reaction gas and a cooling medium is arranged in a front compartment under a front hood, and hydrogen and air that are discharged without being consumed in the air-cooled fuel cell stack are guided to the outside of the vehicle through an exhaust duct connected to a rear portion of the air-cooled fuel cell stack, wherein:

the exhaust duct is composed of a lower side exhaust duct and an upper side exhaust duct which are branched vertically;

the lower side exhaust duct is extended toward the lower side of the vehicle from an exhaust outlet portion of the air-cooled fuel cell stack, and the downstream end portion of the lower side exhaust duct is opened at a lower portion of the front compartment; and the upper side exhaust duct is extended toward the upper side of the vehicle from an upper portion of an outer wall of the lower side exhaust duct, the outer wall extending toward the lower side of the vehicle, and the downstream end portion of the upper side exhaust duct is opened between the rear end portion of the front hood and the front end portion of a front window.

2. The exhaust apparatus of the air-cooled fuel cell vehicle according to claim 1, wherein air serving as the reaction gas and the cooling medium is supplied to the air-cooled fuel cell stack by an air supply fan.

3. The exhaust apparatus of the air-cooled fuel cell vehicle according to claim 1, wherein an upper side opening portion provided at a downstream end portion of the upper side exhaust duct is directed so as to allow exhaust gas to flow along the front window.

4. The exhaust apparatus of the air-cooled fuel cell vehicle according to claim 1, wherein a mountain-shaped flow dividing portion projecting toward the front side of the vehicle is formed on an inner wall of a portion which is located at a branch portion between the lower side exhaust duct and the upper side exhaust duct, and faces the exhaust outlet portion of the air-cooled fuel cell stack.

5. The exhaust apparatus of the air-cooled fuel cell vehicle according to claim 1, wherein the vehicle width direction dimension of the exhaust duct is substantially equal to the vehicle width direction dimension of the air-cooled fuel cell stack.

6. The exhaust apparatus of the air-cooled fuel cell vehicle according to claim 1, wherein an eaves portion projecting toward the rear side of the vehicle is provided on an inner wall of a portion of the upper side exhaust duct, the portion being located on the front side of the vehicle and in the vicinity of the branch portion leading to the lower side exhaust duct.

7. The exhaust apparatus of the air-cooled fuel cell vehicle according to claim 1, wherein a reticulated cover is installed at the upper side opening portion of the upper side exhaust duct.

8. The exhaust apparatus of the air-cooled fuel cell vehicle according to claim 7, further comprising an electric heater for heating the upper side opening portion of the upper side exhaust duct.

* * * * *